Aug. 14, 1923. 1,464,673
F. E. WILCOX ET AL
DIRIGIBLE HEADLIGHT MECHANISM FOR AUTOMOBILES
Filed Sept. 13, 1922 2 Sheets-Sheet 1
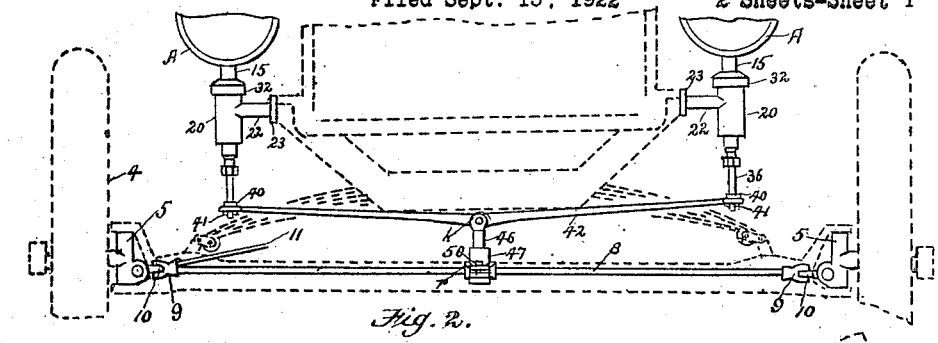
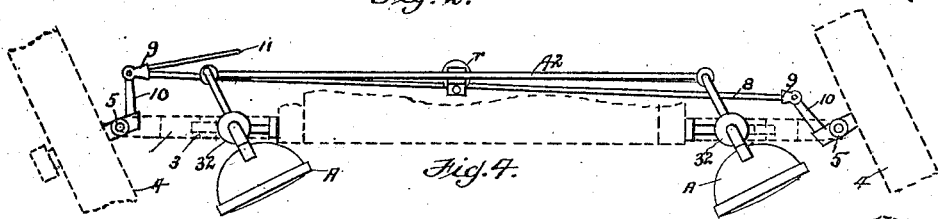
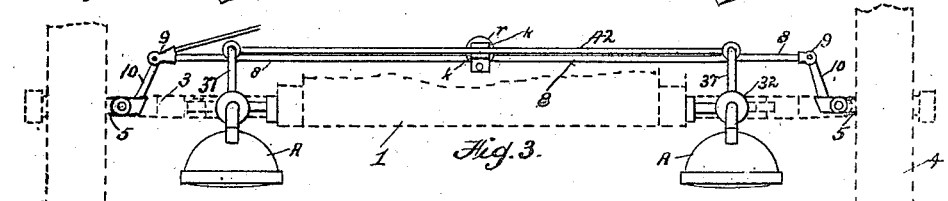
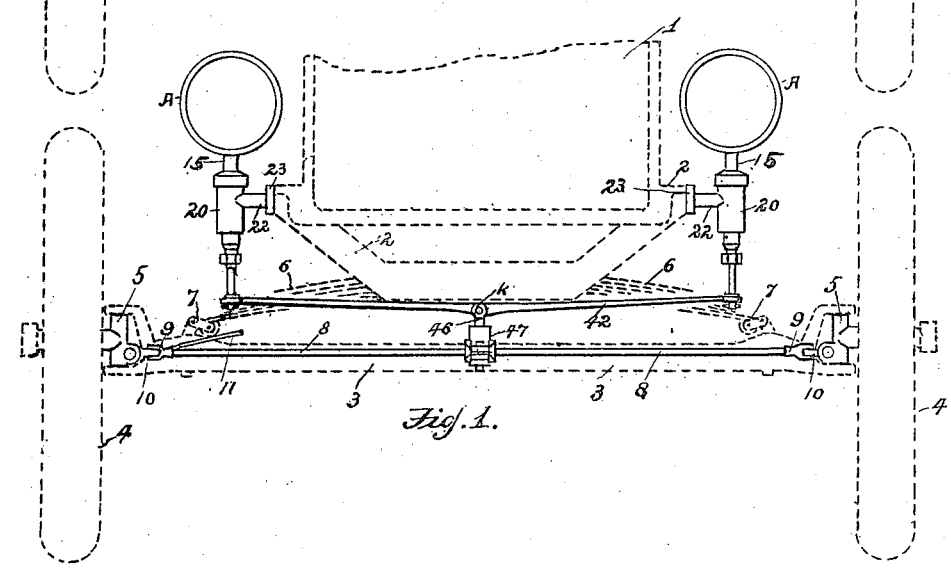
Inventors
Frederick E. Wilcox.
John W. Fink.
by Wm. H. H. Knight,
their Attorney Aug. 14, 1923.
F. E. WILCOX ET AL
1,464,673
DIRIGIBLE HEADLIGHT MECHANISM FOR AUTOMOBILES
Filed Sept. 13, 1922    2 Sheets-Sheet 2
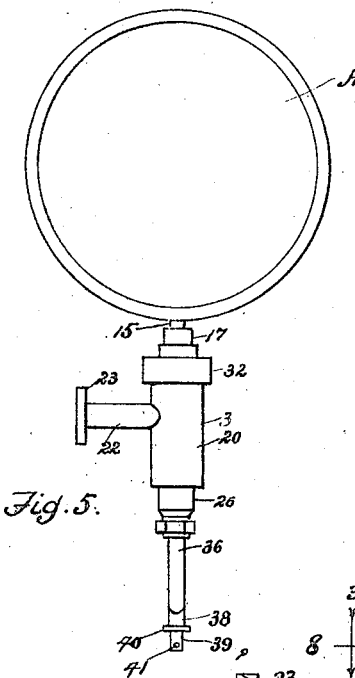
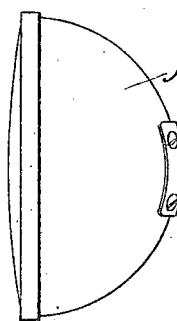
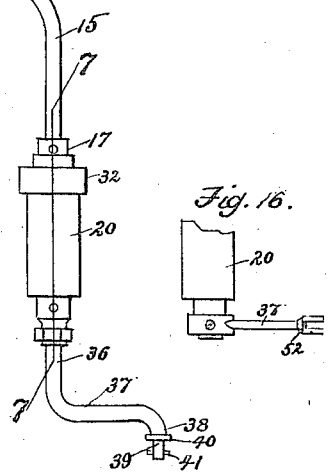
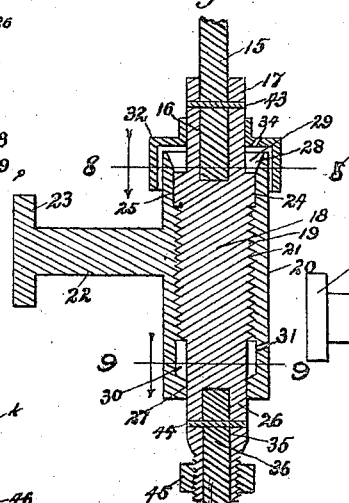
Inventors,
Frederick E. Wilcox
John W. Funk
by William H. H. Knight
their Attorney.

Patented Aug. 14, 1923.

1,464,673

UNITED STATES PATENT OFFICE.

FREDERICK E. WILCOX AND JOHN W. FUNK, OF HANOVER, PENNSYLVANIA.

DIRIGIBLE-HEADLIGHT MECHANISM FOR AUTOMOBILES.

Application filed September 13, 1922. Serial No. 588,092.

*To all whom it may concern:*

Be it known that we, FREDERICK E. WILCOX and JOHN W. FUNK, citizens of the United States, residing at Hanover, in the county of York and State of Pennsylvania, have invented certain new and useful Improvements in Dirigible-Headlight Mechanism for Automobiles, of which the following is a specification.

While the present invention broadly relates to the general class of headlights for automobiles it yet more particularly relates to that branch of said class which comprise both automobile headlights that, known to the art as dirigible headlights, are so mounted in or upon their supports as to be capable of an oscillatory movement thereon in the horizontal plane, and the peculiar mechanism through which such movement is to be determined by the steering wheels of the vehicle, for the purpose of illuminating the roadway that is to be followed by said wheels.

To the end above stated the invention has for one of its principal objects the provision of means new to the art, whereby without the employment of pressure springs of any kind whatsoever, or of jam or pressure nuts or similar devices, the headlights of an automobile while free to be easily oscillated in or upon their supports to any desired extent by their actuating devices, are yet held absolutely from movement of any kind upon their supports when such actuating devices are not in action.

Another of the principal objects of the invention is the provision of means whereby the headlights upon the opposite sides of an automobile are so connected together and to their actuating medium, i. e. the rod which connects the spindles of the forward wheels of such vehicle together, that swaying or rocking of the body of the vehicle upon its springs, or jars due to the movement of the wheels of the vehicle over ruts, rocks or uneven portions of a roadway, or the lateral vibration of the wheels themselves will in no way affect the perfect alignment or action of the headlights or in any way injure them or the mechanism by which they are connected and actuated.

A further object of the invention is the provision of a new and simple system for the actuation of dirigible headlights for automobiles that may be readily applied to different types of such vehicles without material alteration of such parts thereof as is necessary to the action of such system.

A further object of the invention is the provision of a dirigible headlight actuating system which shall be comprised of a minimum of operative parts of simple and durable type and construction.

To the accomplishment of the above set forth objects the invention consists in the construction arrangement and combination of the several parts comprised therein for service substantially as is hereinafter described and illustrated in the accompanying drawings, wherein—

Figure 1, is a front elevation of the running gear and body (the latter partly broken away) of an automobile provided with our invention, and in such view all parts not comprised in such invention or immediately connected to actuate the same, are shown in dotted lines.

Figure 2, shows in front elevation the forward end of an automobile and is in all respects similar to Fig. 1, save alone that the body portion of the vehicle extends in a plane that is not parallel with the plane in which the axle of the vehicle extends as clearly shown by the relative positions of the headlights with regard to the axle. In this view as in Fig. 1, parts that are not immediately connected with the invention are shown in dotted lines.

Figure 3, is a top plan view of a portion of the vehicle shown in Fig. 1, and sets forth the arrangement of our invention therewith, and like unto Fig. 1, those parts of the view not comprised in our invention are shown in dotted lines.

Figure 4, is a top plan of the parts of the vehicle shown in Fig. 3, and is in all respects similar to said Fig. 3, save alone that the headlights and wheels of the vehicle are turned at an angle to the axle thereof.

Figure 5, illustrates, in front elevation, a dirigible headlight mounted upon its support and having its several parts constructed in accordance with our invention.

Figure 6, is a side elevation of the device shown in Fig. 5.

Figure 7, is a vertical longitudinal section taken on the line 7—7, through the body portion of the headlight support.

Figure 8, is a cross sectional view taken through the headlight support on the line 8—8, of Fig. 7, to show the relation of the parts comprised in the support with each other.

Figure 9, is a similar cross sectional view taken on the line 9—9, of Fig. 7, to show parts of the device hereinafter referred to.

Figure 10, is a top plan view of the cap which prevents entrance of moisture to the interior of the headlight support.

Figure 11, is a longitudinal section taken through cap on line 11—11.

Figure 12, illustrates in side elevation, the device which connected to the middle of the rod connecting the wheel spindles, transmits movement to the rod which connects the headlight supports.

Figure 13, is a transverse sectional view taken on the line 13—13, of Fig. 12, to more clearly show the construction of the same.

Figure 14, is a detail side elevation of one member of the device shown in Fig. 12.

Figure 15, is a longitudinal sectional view taken on the line 15—15, through the device shown in Fig 12, and Fig. 16, illustrates a modified form of the crank shown in Fig. 6, whereby the headlight is turned.

Referring to the drawings wherein similar numerals and letters of reference denote similar parts, 1, designates the body of a vehicle provided with our improved dirigible head lights, 2, the frame upon which said body is mounted, 3, the front axle of the vehicle, 4, the wheels which are mounted upon spindles 5, at the opposite ends of the axle, 6, designates one of the springs upon which the frame 2, of the vehicle is mounted and which is in the present instance, hinged at its opposite ends to links 7, pivoted in the usual manner to the opposite ends of the axle 3. 8, designates a rod which extends from one to the other of the spindles 5, upon which the wheels are mounted, and said rod 8, is provided at each of its opposite ends with a yoke 9, by which it is hinged to each of the arms 10, of the spindles 5. The rod 8, is further provided with an actuating rod 11, which extends from one of the yokes 9, upon the rod 8, to connect with a steering wheel not shown in the drawings.

It is to be understood that the several parts of the vehicle, above designated, form no part of our invention and only enter thereinto through their combination therewith.

It is also to be understood that the particular type of construction of vehicle set forth by the drawings, is not essential alone in any way to the proper action of our invention as such will operate with like facility in connection with vehicles of any desired type of construction.

Having thus outlined the particular parts of an automobile with which our invention is to coact we will now proceed to describe the construction of such invention and the manner in which it is mounted upon an automobile and connected with the operative parts thereof above referred to, to coact therewith.

In carrying out our invention we provide a headlight A, of any desired type, with an outwardly and downwardly projecting rod 15, which—connected to the headlight at any convenient point thereon preferably at the middle of the back thereof, see Fig. 6,—extends to and into an axial bore 16, formed in the upper reduced end 17, of a cylindrical shaped fitting 18, which—provided upon its outer surface for a part of its length, with a series of screw threads 19, preferably of small pitch— is, in practice, mounted in a tubular shaped support 20, that is provided upon its inner surface and for a portion of its length, with a series of screw threads 21, of pitch similar to that of the threads 19, upon the fitting 18, with which they are to engage, see Fig. 7.

We provide that the tubular shaped support 20, shall be rigidly connected to the frame 2, of the vehicle and to such end we provide such support with a projecting arm 22, having a flanged outer end 23, to be secured to such frame, see Fig. 1.

As above stated the fitting 18, is to be mounted in the support 20, and to such end we provide that said fitting shall, at its upper end immediately below the reduced portion 17, thereof, have an enlarged cylindrical portion or journal 24, formed thereon to snugly fit a bearing 25, formed therefor in the upper end of the support 20.

We also provide that said fitting 18, shall, for a part of its length at its lower portion, be reduced in a diameter and that such reduced part 26, shall snugly fit a circular aperture 27, formed in the lower end of the support 20, see Fig. 7.

We further provide that the upper end of the enlarged bore of the support 20, above the journal 24, of the fitting 18, shall be outwardly flared or inclined as shown at 28, to form a cylindrical shaped chamber 29, about the reduced portion of the fitting 18, for the reception of a lubricant to facilitate movement of the journal 24, of the fitting 18, in its bearing 25, as well as the screw threaded portions of the device therebelow.

By reference to Fig. 7, of the drawings it will be observed that the screw threads upon both the fitting 18, and the tubular support 20, terminate at a short distance above the lower end of said support and that because of such construction a small cylindrical shaped chamber 30, is formed about the reduced portion 26, of the fitting 18, the purpose of which chamber is to afford a receptacle for such lubricant as may drip from the screw threaded parts above, or if it be deemed necessary an additional supply of lubricant for facilitating the movement of the journal 26, of the fitting 18, in its bearing 27, for the latter named purpose we form an aperture 31, through the support 20, as shown.

By reference to Fig. 7, it will be apparent that, because of the mounting of the journals 24 and 26, of the fitting 18, in the bearings 25 and 27, of the support 20, as above described, such fitting will be absolutely prevented from movement in lateral direction although perfectly free to be easily rotated in said journal bearings, and further that because of the engaging screw threaded portions of said fitting and support all axial movement of such fitting in such support—other than the slight movement incidental to the action of the screw threads upon each other—will be prevented.

We provide the upper end of the fitting 18, with a cap 32, which, constructed as shown in Figs. 10 and 11, closely fits the reduced upper end of said fitting and rests upon a shoulder formed on said fitting as shown; the cap 32, at its sides 33, extends downward around the upper end of the support 20, see Fig. 7, and thus excludes entrance of moisture to the chamber 29, a small aperture 34, formed through the cap 32, permits the passage of lubricant to and into the chamber 29.

We provide the lower end of the fitting 18, with an axial bore 35, to receive the upper arm 36, of a crank and body portion 37, of which extends backwardly in the plane of the curved portion of the rod 15, and thence downwardly to provide an arm 38, which at its lower end, is reduced slightly as shown at 39, to provide a shoulder against a washer 40, abuts, which washer in conjunction with a cotter pin 41, operates to hold upon said arm 38, one of the apertured ends of a rod 42, which extends thence and is connected at its opposite end, to a similar crank arm at the opposite side of the vehicle.

We provide that the rod 15, connected with the headlight, shall be held in position in the upper end of the fitting 18, by a pin 43, which passes through the upper end of such fitting and rod as shown, see Fig. 7.

The crank arm 36, is in like manner held within the axial bore 35, of said fitting 18, by a pin 44, and said arm 36, is still further secured to said fitting by a jam nut 45, which coacts with the screw threaded lower end of the fitting 18, which to such end, is reduced in diameter, tapered and split for a portion of its length, that the upward movement of the jam nut thereon, will operate to draw the lower end of the reduced part of the fitting into the closest possible contact with the crank arm 36.

We provide that movement of the rod 8,—which connects the arms 10, of the spindles 5, together for the purpose of turning the wheels 4, 4, of the vehicle,—shall also operate to move the rod 42, to turn the headlights A, A, in unison with and direction of said wheels, to which end we connect the said rods 8, and 42, together, preferably at the middle of each thereof to move in unison when actuated.

To the above named end we provide that the middle portion of bar or rod 42, shall be enlarged upon its upper and lower surfaces and its opposite sides so flattened that it may be readily mounted between ears $k$, $k$ formed upon the upper end of a short downwardly projecting rod, 46, which freely moves up and down in a short tubular section 47, which is at one of its sides provided with a transverse groove 48, that extends, in depth, quite to the axial bore of such section, see Fig. 15, and which in practice is to receive the rod 8, see Fig. 12, and to be held in close engagement therewith by a clip which encircles the tubular section 47, and the rod 8,—to which latter named end is provided with apertures 49, which fit said rod 8,—and is clamped thereupon by screws 50, as shown in Fig. 12.

In practice the rod 46,—which is so hinged to the middle of the bar 42, that the opposite ends of such bar are free to be moved up and down as illustrated in Fig. 2, through the swaying of the body of the vehicle due to ruts, rocks, uneven roadways, etc. without exerting the slightest strain upon the operative parts of the device, and further is qualified to fulfill its functions both in or out of alignment with the rod 8, by which it is moved,—is first placed in position in the tubular section 47, and thereafter hinged to the rod 42, and when so placed will operate to move said rod in unison with the rod 8, which, because of the disposition of the tubular section 47, and its connection with said rod 8, is practically immediately therebelow.

From the construction and arrangement of the connections between rods 8, and 42, it will be understood that the small force necessary to swing the headlights A, A, in their supports will not in any way be sufficient to move the tubular section 47, from its operative position upon the rod 8, hereinbefore described.

Figure 16, illustrates a modified form of crank which may be employed in lieu of that shown in Fig. 6. In such modification the crank arm is made without a bend and is connected to the decreased lower end of the fitting 18, by screws or otherwise and has at its outer end 52, a bifurcated portion to provide ears between which to hinge the end of the connecting rod 42.

Further description of our invention will not, it is thought, be necessary to a clear understanding thereof.

We are aware that it is not new to the art to so connect dirigible headlight of automobiles with the rod which connects the wheel spindles together, so that the movement of said rod will operate such headlights in the same direction of and in unison with the other, and we therefore do not lay claim to such construction.

Having thus described our invention we claim and desire to secure by Letters Patent—

1. In a dirigible headlight mechanism a cylindrical fitment having its opposite ends reduced in diameter and provided with axial bores to receive respectively the upper a rod to carry a headlight and the lower one arm of a crank to turn said fitment in its support and having such reduced portions transversely apertured to permit passage of a securing pin to and through said rods and having the lower of said reduced portions provided with an axial slit and with a tapering screw threaded outer surface to receive a jam nut to exert great pressure upon said reduced portion and the rod therein held and having near its upper end a journal of large diameter and near its lower end a journal of small diameter and having its outer surface between said journals provided with screw threads, in combination with a support to receive said fitment such support having an axial bore of large diameter from its top to near its lower end and an axial bore of small diameter through said lower end to form a bearing for the lower journal of the fitment and having near its upper end its axial bore increased to form a bearing of the upper journal of the fitment and having that part of said bore above said upper journal flared outwardly to its outer upper edge and having the surface of the axial bore between the journal bearings provided with screw threads to engage and coact with the screw threaded portion of the fitment and having an arm to extend and be secured to an automobile to hold said support rigid therewith, and means actuated by the steering mechanism of said automobile and connected to turn the fitment and a headlight rigid therewith upon its support.

2. In a dirigible headlight mechanism for automobiles a support to be rigidly connected to each of the opposite sides of an automobile, each of said supports having an axial bore cylindrical in cross section and provided upon its surface with journal bearings and with a series of screw threads intermediate thereof, a cylindrical fitment to be mounted in each of said supports said fitment having a headlight and a crank secured respectively to its upper and its lower end and provided with journals and upon its surface intermediate thereof with screw threads to engage and coact with the screw threads and journal bearings of the support, and a connecting rod extending between and hinged at its opposite ends respectively to the cranks of the fitments upon the opposite sides of the automobile to turn said fitments and their connected headlights in synchronism, in combination with a rod extending between and connected to each of the wheel supporting spindles at the opposite sides of the automobile, vertically movable connections between said latter named rod and the rod which connects the cranks of fitments together to ensure synchronous thereof, and connections between one of said rods and the steering wheel of the automobile to be moved by the movement of said wheel to turn the supporting wheels of the vehicle and the headlights simultaneously in the same direction.

3. In a dirigible headlight mechanism for automobiles a support to be rigidly connected to each of the opposite sides of an automobile each of said supports having an axial bore cylindrical in cross section and provided with journal bearings and a series of screw threads therebetween, a cylindrical fitment to be mounted in each of said supports and provided with journals and a series of screw threads therebetween to engage and coact with the journal bearings and screw threads of the support and further provided upon its top with a headlight support and upon its bottom with a crank to turn said fitment when actuated, a connecting rod to extend between and be hinged to the cranks upon the fitments at the opposite sides of the automobile said rod having its middle portion enlarged, flattened and provided with an aperture to receive a pivotal pin, in combination with a rod extending between and connected to the wheel carrying spindles at the opposite sides of the automobile, a vertically disposed tubular fitment rigidly clamped to the middle of said rod, a short cylindrical rod placed to freely move in said tubular fitment and having its upper end bifurcated to provide apertured hinging ears for the reception of the flattened portion of the rod which connects the cranks of the headlight carrying fitment, and a pivotal pin to hold said rod in position between said ears.

4. In a dirigible headlight mechanism for automobiles a rod extending between and connecting the wheel spindles at the opposite sides of an automobile, a short tubular fitment provided upon its outer surface with a transversely extending recess to impinge against and partly surround said connecting rod intermediate of the ends thereof, a clip to extend about the tubular fitment and apertured for the passage of the connecting rod, and clamping screws to hold said clip in rigid connection with said connecting rod and the fitment in vertical position, in combination with a cylindrical plunger mounted to freely rotate and move upward and downward in the tubular fitment and having its upper end bifurcated to provide apertured ears, and a rod hinged at its opposite ends to the crank arms of the headlight carrying fitments and at its middle between the ears of the plunger.

5. In a dirigible headlight mechanism for automobiles a tubular support rigidly connected to each of the opposite sides of an automobile provided upon its inner surface with journals and a series of screw threads therebetween, a cylindrical fitment mounted in said support having its upper and lower ends reduced in diameter and provided respectively with a rod to carry a headlight and with a crank to turn said fitment and further provided with journals and screw threads therebetween to engage and coact with the journal bearings and screw threads of the support, a cap rigid with said fitment to extend downward about the upper end of the support to exclude moisture therefrom, and annular chambers formed within the supports about the fitment, a rod to connect the cranks upon the fitments, and connections from said rod to the steering mechanism to impart movement therefrom to said fitment and its connected headlights.

In testimony whereof we hereto affix our signatures in presence of two witnesses.

FREDERICK E. WILCOX.
JOHN W. FUNK.

Witnesses:
M. BERNADETTE KRICHTEN,
JOHN C. KREBS.